(12) United States Patent
Giles

(10) Patent No.: US 6,917,998 B1
(45) Date of Patent: Jul. 12, 2005

(54) REUSABLE COMPLEX MULTI-BUS SYSTEM HARDWARE PROTOTYPE SYSTEM

(75) Inventor: Christopher M. Giles, Lafayette, CO (US)

(73) Assignee: LSI Logic Corporation, Milpitas, CA (US)

( * ) Notice: Subject to any disclaimer, the term of this patent is extended or adjusted under 35 U.S.C. 154(b) by 536 days.

(21) Appl. No.: 10/027,936

(22) Filed: Dec. 21, 2001

(51) Int. Cl.$^7$ .......................... H01L 25/00; G06F 13/00
(52) U.S. Cl. ...................................... 710/300; 326/101
(58) Field of Search ................................. 710/300–301, 710/305, 313; 361/679, 728–731, 735–737, 748, 760, 788, 790, 803; 326/101; 716/4

(56) References Cited

U.S. PATENT DOCUMENTS

| | | | | |
|---|---|---|---|---|
| 5,122,691 A | * | 6/1992 | Balakrishnan | 326/86 |
| 5,313,699 A | * | 5/1994 | Freige et al. | 361/736 |
| 6,073,229 A | * | 6/2000 | Crane et al. | 712/33 |
| 6,081,430 A | * | 6/2000 | La Rue | 361/788 |
| 6,175,490 B1 | * | 1/2001 | Papa et al. | 361/686 |
| 6,321,285 B1 | * | 11/2001 | Sheafor et al. | 710/306 |
| 6,526,525 B1 | * | 2/2003 | Chang | 714/40 |
| 6,590,907 B1 | * | 7/2003 | Jones et al. | 361/736 |
| 2002/0019924 A1 | * | 2/2002 | Davies et al. | 712/1 |
| 2002/0118201 A1 | * | 8/2002 | Mukherjee et al. | 345/504 |

OTHER PUBLICATIONS

"Universal LSSD–Hardware Test Interface", IBMTDB, May 1991, vol. 33, Issue 12, pp. 306–308.*
RD 408012A Apr. 1998.*

* cited by examiner

Primary Examiner—Paul R. Myers
(74) Attorney, Agent, or Firm—Westman, Champlin & Kelly, P.A.

(57) ABSTRACT

A configurable and scaleable multi-bus platform for developing, testing and/or debugging prototype systems to be implemented in an integrated circuit includes a backplane providing multiple busses. Multiple system bus cards can be coupled to the backplane, and each of the system bus cards includes a system bus which is electrically coupled to at least one bus on the backplane. The system bus cards also include a bus infrastructure device providing support logic for operating the system bus. Daughter cards, containing master or slave devices for particular design configurations, are coupleable to the system bus cards in order to simulate a system bus which will be implemented in the integrated circuit. The backplane and system bus cards, as well as other components, can be easily reused in other projects for designing, testing and debugging other integrated circuits.

17 Claims, 6 Drawing Sheets

REUSABLE COMPLEX MULTI-BUS SYSTEM HARDWARE PROTOTYPE SYSTEM

BACKGROUND OF THE INVENTION

The present invention relates generally to integrated circuit (IC) design and debugging. More particularly, the present invention relates to apparatus and methods for developing, testing and/or debugging prototype systems to be implemented on a single IC die.

As transistor size continues to decrease, massively complex systems are being implemented on a single die. This results in a "system-on-a-chip" that is exceedingly difficult to debug. In the current environment, systems-on-chips are moving toward multiple system busses, each of 64-bits in width. These busses all operate independently and may have multiple masters and slaves. Each may also connect to common shared slaves, or may communicate via bus bridges. These systems may also contain multiple microprocessors, memory controllers and other peripherals.

Debugging such systems is equivalent to debugging the printed circuit board (PCB) type systems of ten years ago. However, in the case of PCB-type systems, debugging was comparatively easy since all signals were essentially visible or accessible outside of a packaged die at the PCB level as test points, or at the PCB-to-backplane connection via the connectors. Debugging a system-on-a-chip is much more difficult.

With the high level of integration which is possible in semiconductor processes, the mask costs are rising exponentially. With the high mask costs, it is very expensive to build the prototype system in silicon. With each mask redesign and subsequent fabrication in silicon, the system development costs rise by as much as one million dollars. Therefore, it is prohibitively expensive to design and debug a system by repeatedly redesigning the mask and repeatedly fabricating corresponding prototypes in silicon.

Another problem encountered in system-on-a-chip design relates to the development time required to design the system. Frequently, software developers must wait for hardware designers to complete a prototype chip. Once the hardware is available, the software developers write and test code for it. If the software developers discover a problem in the hardware design, it is frequently necessary to go back and revise the hardware design, creating a new mask, and fabricating a new chip. In addition to being expensive, this serialized and potentially iterative process is very time consuming. With the rapid change in technology, a lengthy development process is often unacceptable.

Current solutions to these problems include: (1) hardware/software co-simulation; (2) use of field programmable gate array (FPGA) prototype systems; (3) emulation of designs in large electronic arrays that map designs into FPGAs and simulate function; and (4) building huge PCBs to capture the complete system design. The first approach, hardware/software co-simulation, is lacking because current solutions of this type rely on specific software vendors to have all components modeled correctly for simulation acceleration. When they are not modeled correctly, the tool simulates extremely slowly. In real-time applications in which the only true test that the software under development is working correctly is to run a real-time data stream, this solution and performance is unacceptable, particularly as complexity increases.

The second current approach to resolving the above-identified problems, use of FPGA prototype systems, is lacking primarily for the same reasons as the first approach. These systems are not capable of processing the real-time data streams which will exist on a system-on-a-chip. In addition, the complexity of the platform always leads to a lesser-implemented system and design tradeoffs. It is not sufficient to validate a design in this manner since the design that is being validated is different from the one that will be implemented in silicon. The software and system-level engineers, as well as the VLSI engineers, require that the real system be prototyped.

The third approach to resolving these problems, emulation of designs in large electronic arrays that map designs into FPGAs and simulate function, is lacking since the systems do not operate quickly and are often architected to handle the platform-based approach. Again, the same real-time operation is in question, as is the capacity of this solution. These electronic arrays are typically not large enough to handle the systems currently being built. The fourth approach, building a huge printed circuit board to capture the complete system design, is lacking primarily because it is not reusable. Any such printed circuit board would be specific to each platform-based system. The costs would be very high, and the debug and validation of the system cannot be leveraged into other projects.

Therefore, a solution to these design and debugging IC development issues, which has relatively low costs per project and which does not excessively delay the development process, would be a significant improvement in the art.

SUMMARY OF THE INVENTION

A configurable and scaleable multi-bus platform for developing, testing and/or debugging prototype systems to be implemented in an integrated circuit includes a backplane providing multiple busses. Multiple system bus cards can be coupled to the backplane, and each of the system bus cards includes a system bus which is electrically coupled to at least one bus on the backplane. The system bus cards also include a bus infrastructure device providing support logic for operating the system bus. Daughter cards, containing master or slave devices for particular design configurations, are coupleable to the system bus cards in order to simulate a system bus which will be implemented in the integrated circuit. The backplane and system bus cards, as well as other components, can be easily reused in other projects for designing, testing and debugging other integrated circuits.

DETAILED DESCRIPTION OF THE PREFERRED EMBODIMENTS

The present invention includes a scalable platform for designing and debugging systems which are to be implemented in an integrated chip (IC). The scalable platform aids hardware designers and software developers in bringing IC designs to market more quickly. The scalable platform of the present invention uses a modularized hardware approach which, in addition to facilitating a faster development process, allows the hardware platform to be reused in different projects, thus spreading the costs of the platform over multiple projects.

Figure 1:
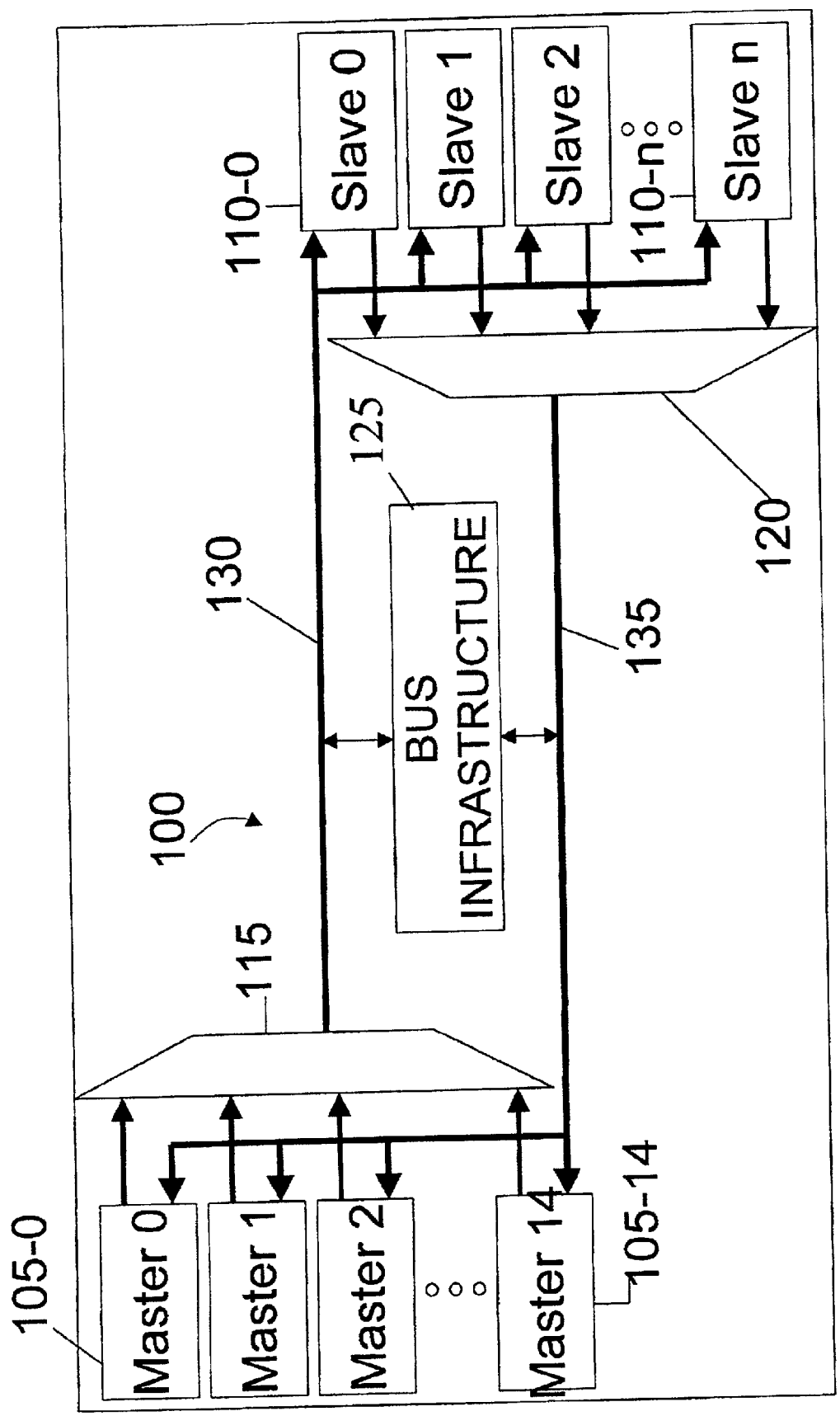
FIG. 1 is a block diagram illustrating a common on-chip system bus.

FIG. 1 is a block diagram illustrating a system bus 100. System bus 100 includes master multiplexer (MUX) 115, read return MUX 120, bus infrastructure device(s) 125, multi-master bus 130, and multi-slave bus 135. As illustrated in FIG. 1, system bus 100 frequently serves a large number of master devices 105 and slave devices 110. Master and slave devices 105 and 110 communicate via multi-master bus 130 and multi-slave bus 135, which are controlled by bus infrastructure device(s) 125.

FIG. 1 illustrates master devices 0–14 (labeled 105-0 through 105-14) and slave devices 0–n (labeled 110-0 through 110-n), but the number of master and slave devices shown is only an example. The master and slave devices are coupled to the multi-master bus and the multi-slave bus, respectively, using MUX 115 and MUX 120. Examples of master devices 105 include central processing units (CPUs), digital signal processors (DSPs), direct memory access (DMA) engines, system bus-to-system bus (S2S) bridges, expansion bus/glueless interface bridges, peripheral component interconnect (PCI) devices, universal serial bus (USB) devices, IEEE-1394 devices, and customer intellectual property (IP) devices. Examples of slave devices 110 include memory controllers, USB devices, IEEE-1394 devices, PCI devices, integrated drive electronics (IDE) devices, memory controllers, expansion bus/glueless interface bridges, S2S bridges, serial ports, customer IP devices and the like.

Bus infrastructure 125 includes devices such as an arbiter (Arb) and an address decoder (AddrDec). A multi-master bus 130 requires, at a minimum, an arbiter, while a multi-slave bus 135 requires at a minimum an address decoder. However, bus infrastructure 125 can include other devices. Generally, FIG. 1 illustrates a bus system architecture 100 which allows master devices to communicate with slave devices and vice versa.

Figure 2:
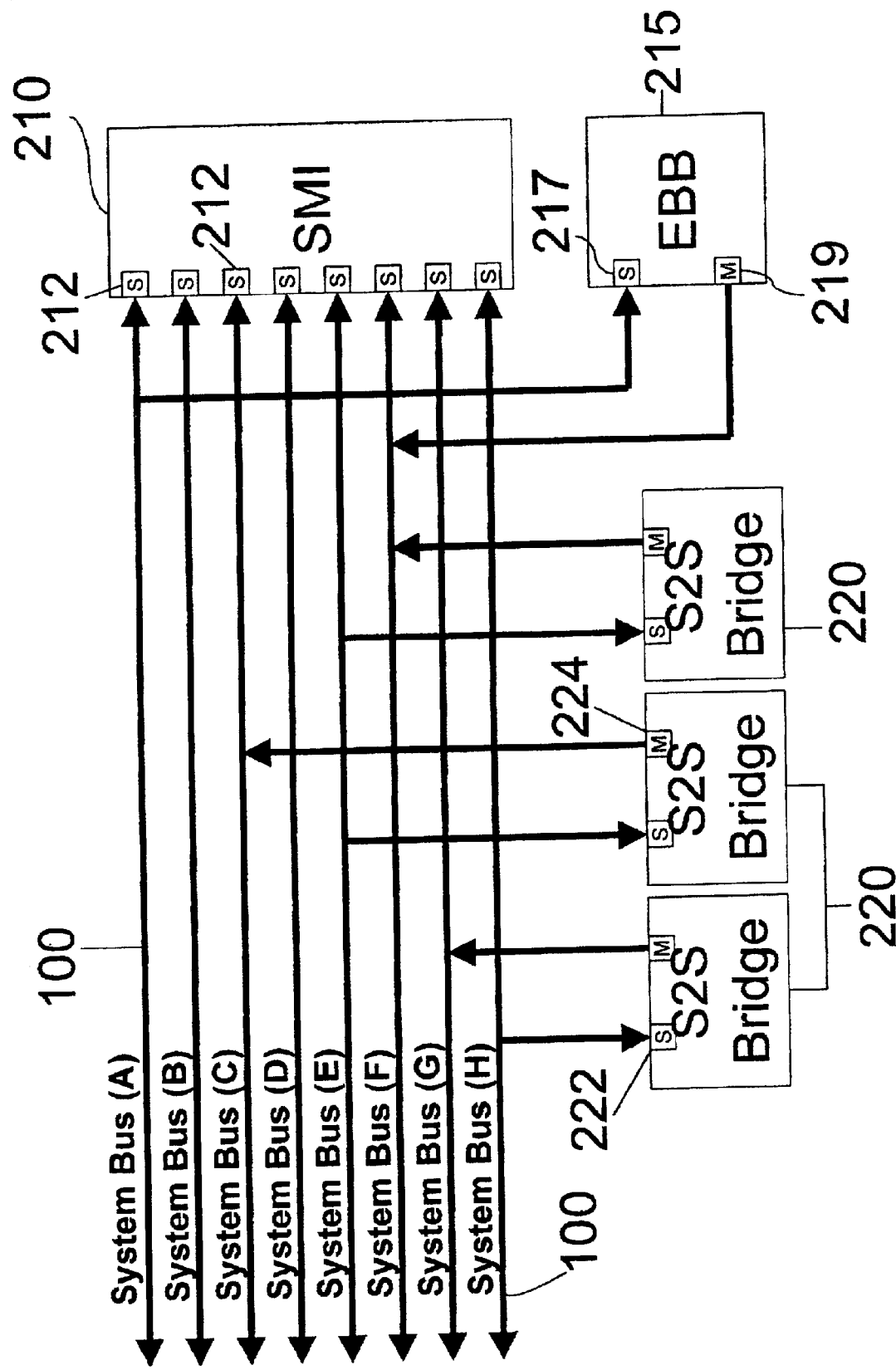
FIG. 2 is a block diagram illustrating an example of a system on an IC.

FIG. 2 is a block diagram illustrating an example of a system having multiple system busses and multiple devices on each bus. Examples of such devices are given in FIG. 2. Such devices can have single bus master or bus slave ports, or can be multi-port devices. FIG. 2 shows each of system busses 100 coupled to a slave port 212 of an exemplary multi-port device, a multi-port memory controller 210. As illustrated, this multi-port memory controller 210 is shown as being a system memory interface (SMI), but this illustration is provided as an example and is not intended to limit the invention. The SMI 210 serves as a unified interface to double data rate (DDR) DRAM. Thus, SMI 210 is a multiple bus interface slave. Another example of a multi-port device is a expansion bus bridge, implementing a glueless interface to other generic off-chip devices. The expansion bus bridge (EBB) 215 includes a slave port 217 and a master port 219 and is used such that an external device (for example a CPU) can access internal static random access memory (SRAM), and an internal device can access external devices. Again, the SMI and EBB shown in FIG. 2 as devices 210 and 215 are provided as examples. In other embodiments, devices 210 and 215 can be replaced with other multi-port devices.

In a typical system, SMI 210 (or other multi-port devices 210) can have between one and eight slave interfaces 212 each coupled to a different system bus 100. Expansion bus bridge 215, can bridge between any two system busses 100 and need not include the master and slave interfaces. Further, a typical system will include multiple S2S bridges 220 in order to couple a transaction on one system bus to another system bus. Bridges 220 typically include slave ports 222 and master ports 224 in order to accomplish this task. By definition, bridges 220 can be included to couple any two different system busses 100 together. Thus, with a large number of system busses accessing DDR DRAM via SMI 210, and with multiple bridges 215 or 220 coupling various combinations of system busses, an exemplary system to be implemented in an IC can be quite complex.

With the large number of combinations of bus bridges which are possible in systems of this type, modeling the system using a fixed PCB or other techniques would require that a very large number of bridges be included and that all of the bridges be individually enableable and disableable. To accomplish that requirement, extra software would have to be developed in order to control this aspect of the hardware development system. This places an extra burden on the software developers, and is therefore not desirable.

Figure 3:
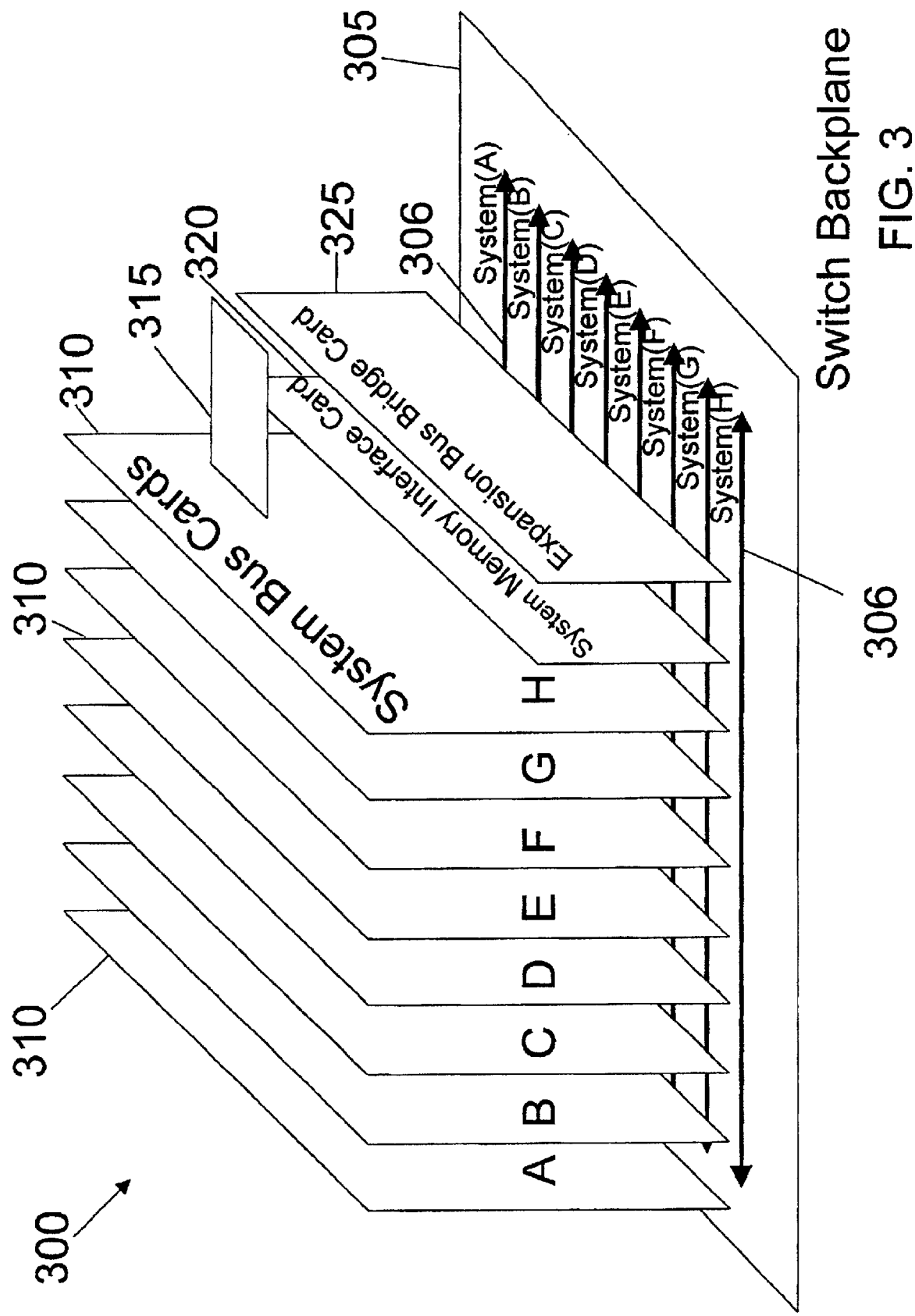
FIG. 3 is a block diagram illustrating a configurable and scalable multi-bus architecture used to test hardware and software designs in accordance with the present invention.

FIG. 3 is a block diagram illustrating development acceleration system 300 in accordance with the present invention. System 300 includes a switch backplane 305 which contains multiple system busses 100 of the type shown and described in FIGS. 1 and 2. System 300 also includes multiple system bus cards 310 (system bus cards A–H are shown), daughter cards 315, and multi-bus-port modules or cards 320 and 325. As an example, modules or cards 320 and 325 are shown as being an SMI card and an EBB card, respectively. However, as discussed, these modules or cards can contain other multi-bus-port devices. System 300 can also include other components.

Switch backplane 305 is a card containing the multiple busses 306 which correspond to, and work in conjunction with, system busses 100 discussed above. As will be discussed in greater detail, the system busses are primarily contained on system bus cards 310, and the busses 306 serve the purpose of allowing any system bus to communicate with any other system bus. Thus, switch backplane 305 serves as a large switch, with the switch functions determined by the make-up of the particular system bus cards 310. In some embodiments of the invention, each of system bus cards 310 is identical and is connected to each of the busses 306 on switch backplane 305. While busses 306 shown on backplane 305 are described as being distinct from the system busses 100 on system bus cards 310, busses 306 on backplane 305 can also be considered to form portions of the respective similarly named system busses 100. System bus cards 310 are also described below in greater detail with reference to FIG. 5.

Each system bus card 310 will include multiple slots or connectors for receiving one or more daughter cards 315. The daughter cards contain any specialized components or devices which are specific to a particular IC design project. Thus, the system bus cards are generic and reusable in future design projects. For a particular IC design project, the daughter cards 315 can be populated with master and/or slave devices which will be implemented in relation to a particular system bus in the final IC. Thus, for a particular design project, specific devices such as CPUs, graphics engines and others are built into a daughter card 315 which can be specifically designed for the particular project. In some embodiments, some of daughter cards 315 can be reusable as well.

Multi-bus-port modules or cards 320 and 325 can be configured specifically to address the requirements of a particular IC design project. For example, modules or cards 320 and 325 can be a SMI card and an EBB card included to implement the SMI EBB functions described above with reference to FIG. 2. Like system bus cards 310, modules or cards 320 and 325 couple to busses 306 on switch backplane 305 via connectors.

Figure 4:
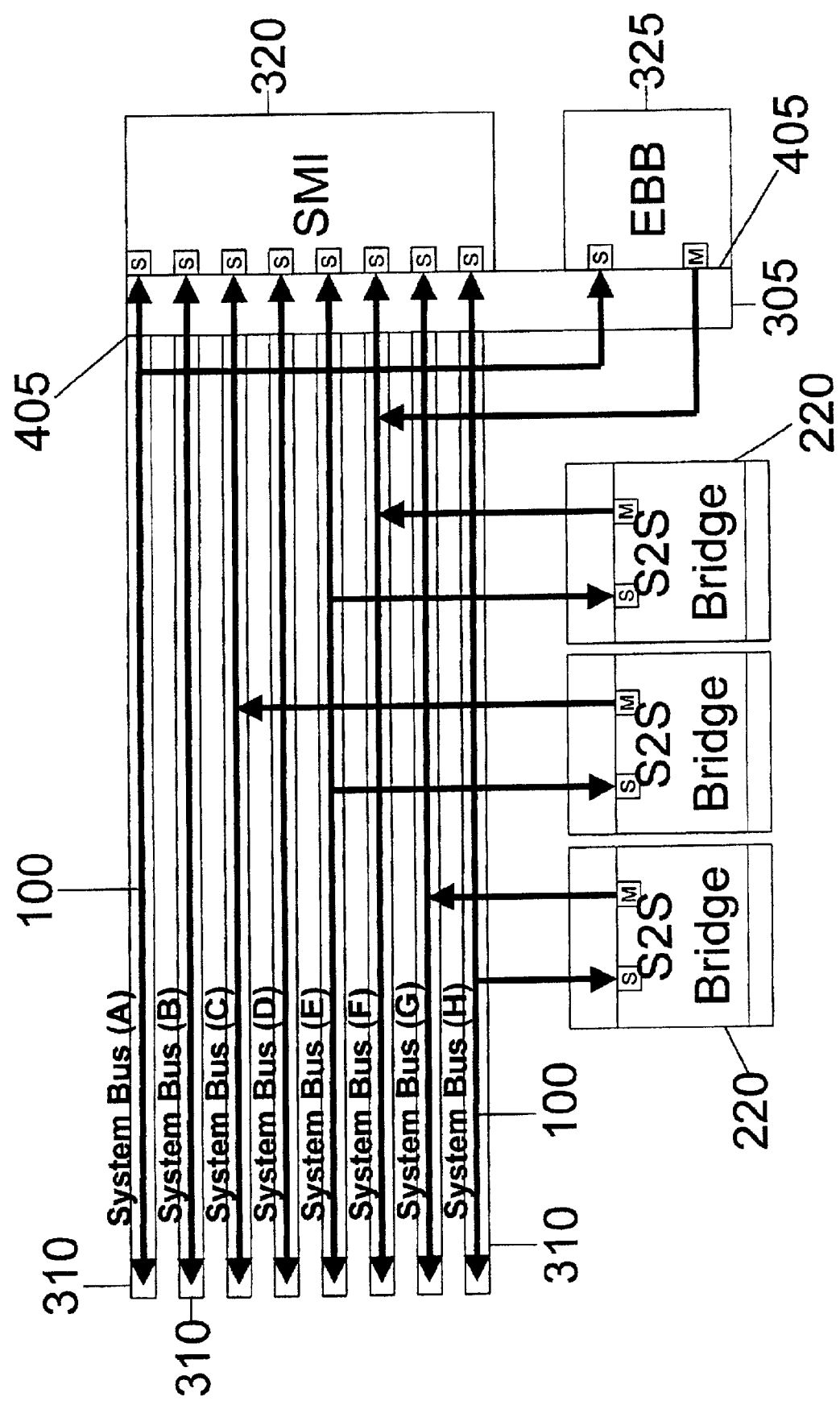
FIG. 4 is a block diagram illustrating, in greater detail, aspects of the system shown in FIG. 4.

FIG. 4 is a diagrammatic illustration of the concepts of the development acceleration system 300 shown in FIG. 3. As illustrated in FIG. 4, system bus cards 310 are each connected to switch backplane 305 via connectors or connection interfaces 405. Each of the system busses 100 resides primarily on its own system bus card 310 which contains the bus infrastructure 125 (shown in FIG. 1) for the particular bus. However, as discussed above, a portion of each system bus 100 can also be considered to reside on switch backplane 305 as illustrated in FIG. 3. The system bus 100 on any particular system bus card 310 is directly electrically coupleable to the corresponding portion of the same system bus on switch backplane 305.

Also as illustrated in FIG. 4, each multi-bus module can be positioned on its own separate card which can be connected to switch backplane 305 via a connector or connection interface 405. As an example, an SMI card 320 and an EBB card 325 are each connected to switch backplane 305 as was also shown in FIG. 3. In the illustration of the invention shown in FIG. 4, S2S bridges 220 are shown separately from system bus cards 310. However, in some embodiments of the present invention, bus bridges 220 sit in FPGA on particular system bus cards 310, but map across the portions 306 of the system busses on switch backplane 305.

Figure 5:
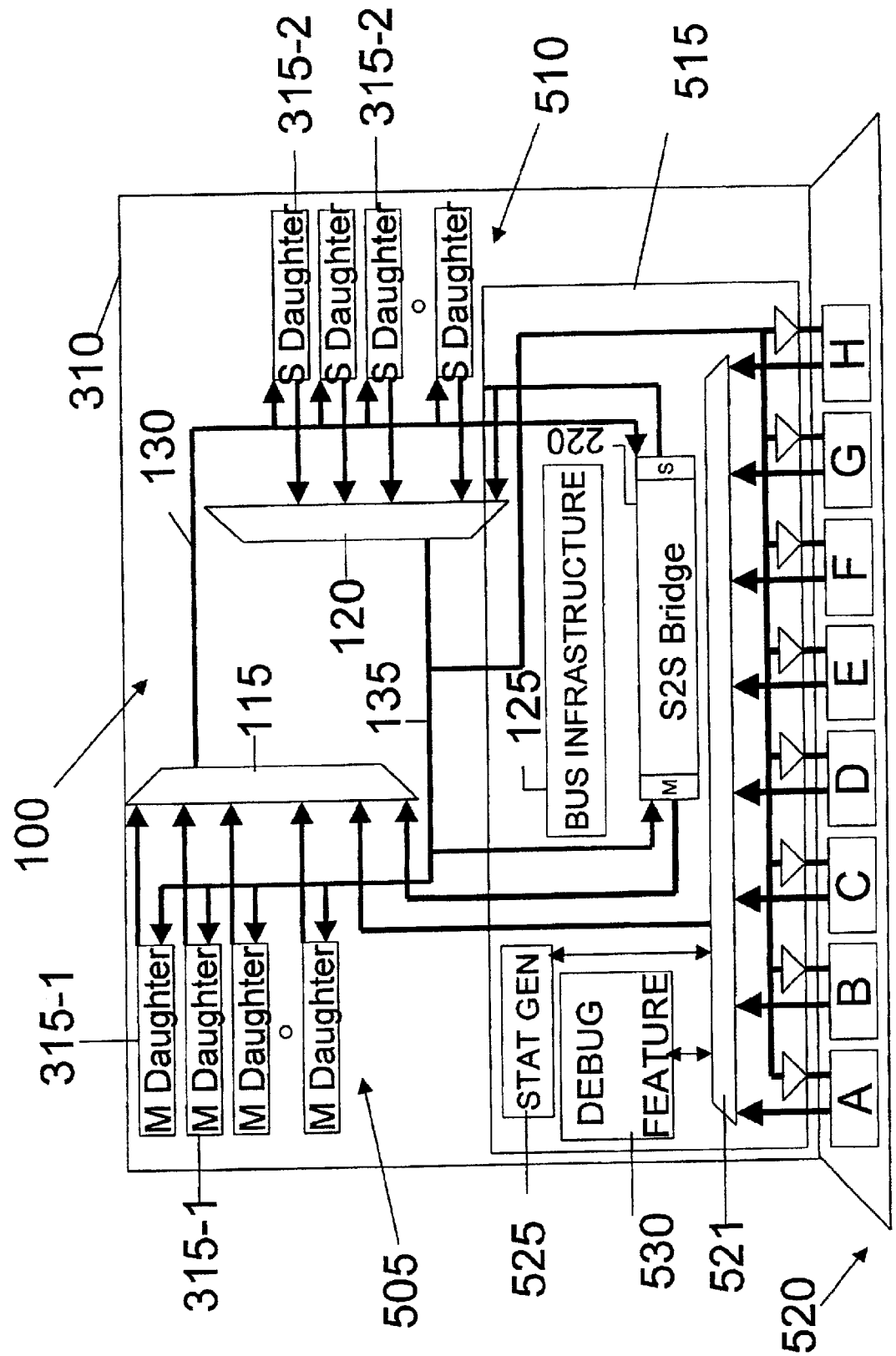
FIG. 5 is a block diagram illustrating a system bus card, in accordance with embodiments of the present invention, which can be used in the system shown in FIGS. 3 and 4.

FIG. 5 is a diagrammatic illustration of one embodiment of a system bus card 310 used in the present invention. System bus card 310 includes master slots 505 configured to receive one or more master daughter cards 315-1 which contain master devices of the type discussed above with reference to FIG. 1, for example. System bus card 310 also includes slave slots 510 for receiving slave daughter cards 315-2 which contain devices of the type also discussed above with reference to FIG. 1. The master and slave devices on daughter cards 315-1 and 315-2 communicate with each other via master MUX 115 and multi-master bus 130, or via read return MUX 120 and multi-slave bus 135. Bus infrastructure 125 is contained in one or more FPGAs 515 on system bus card 310 for controlling the operation of system bus 100 and its components. One or more bus bridges, such as S2S bridge 220, are also included on system bus card 310 in order to bridge from one system bus to another. The bridges can also be implemented in FPGA(s) 515. Communication between system bus 100 on a particular system bus card 310 and the corresponding bus on switch backplane 305 can occurred via FPGA 515 and connector 520.

In some embodiments of the present invention, system bus card 310 also embodies additional features which are usable in evaluating the performance of the hardware design and/or debugging the design. As illustrated in FIG. 5, FPGA(s) 515 can also be configured to implement statistic generating circuit or functions 525 and debugging features 530. Statistic generating functions 525 and debugging features 530 are coupled to connector 520 via MUX 521 such that they can be accessed by the designers in order to verify system performance and/or debug system errors.

Because the hardware is so highly configurable, it is possible to design the architecture incorrectly. In a system design with many system busses available and a large number of different master and slave devices, there is much room for design choices which can have a significant impact on system performance. For example, determinations must be made as to which system bus a particular CPU, graphics engine, or other device should be placed on. If not carefully determined, some of the master devices will not receive sufficient bandwidth on the system busses. Therefore, it is very beneficial to be able to test different architectures while trying to determine how many system busses will be needed and/or where particular devices are to be placed on the system. With the modularized hardware prototyping approach of the present invention, master and slave devices on daughter cards 315 can be easily moved to a different system bus 310 in order to test a variety of different configurations for optimal performance.

In order to gauge performance of different arrangements, statistic generator 525 can be configured to accumulate statistics which are indicative of performance. For example, statistic generator 525 can record how many cycles a system bus was active and actually moving data. Statistic generator 525 can also include latency counters which calculate the length of time from a request of data by a master device until the time that the data actually arrived. Other statistic generating features such as histogram generators can also be included in statistic generating circuitry 525 so that performance during historical time samples can be analyzed.

Debugging features 530 can be included so that if the hardware or the software isn't working correctly, the hardware or software bugs can be identified more easily. For example, debugging features 530 can be designed into FPGA 515 in order to allow the hardware designers or the software developers to sample and hold various electrical signals. Other types of debugging features can also be included. Since software for statistic generating circuitry 525 and debugging features 530 is likely to be necessary in system 300, but not in the final IC design, the software used in system 300 will be a super set of the software which will be implemented in the silicon device. The software for the statistic generating circuitry and the debugging features will allow access to these features via special registers which can be read by the host system or by a debug controller monitor program, for example.

Figure 6:
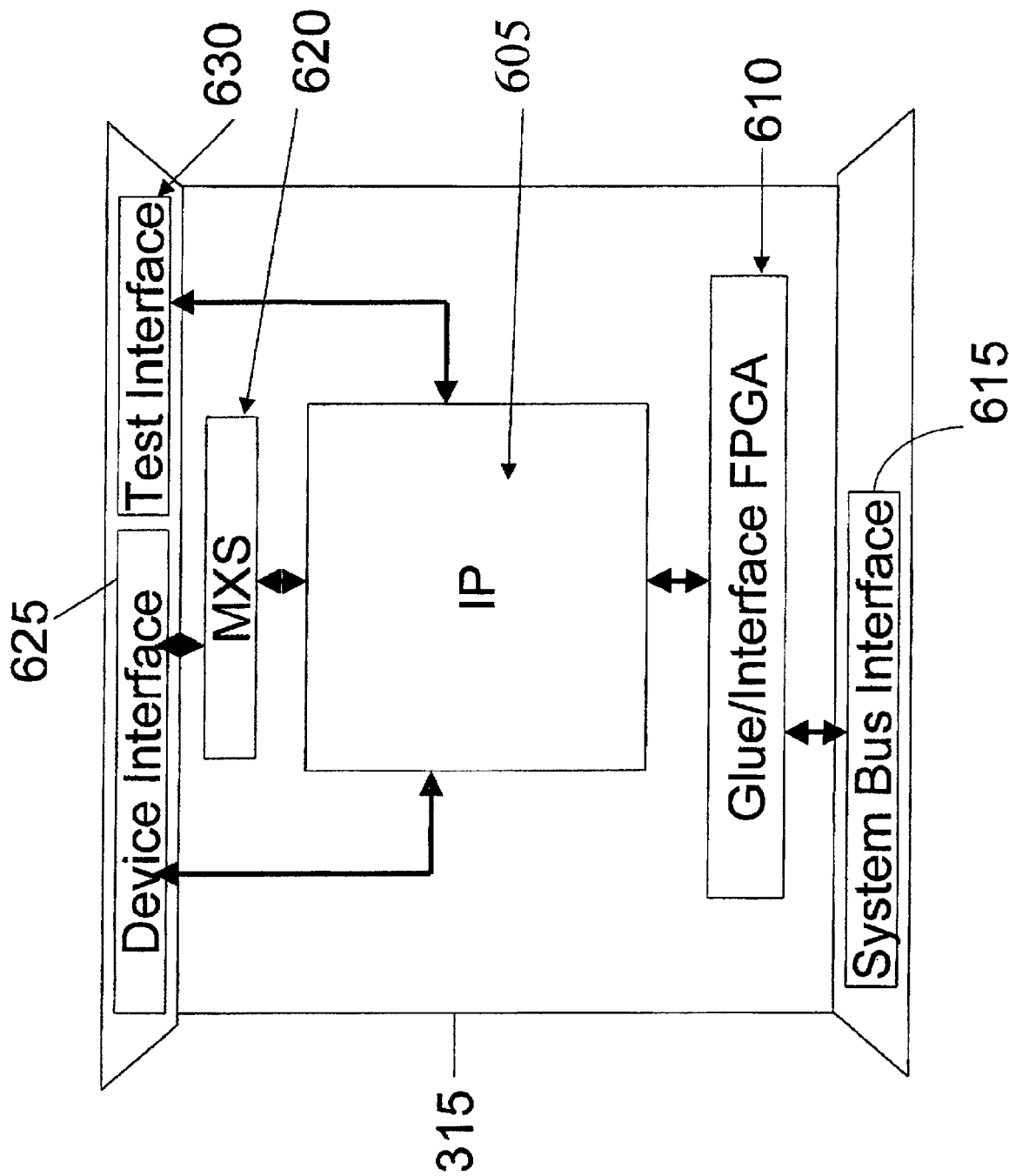
FIG. 6 is a block diagram illustrating a daughter card, in accordance with embodiments of the present invention, which can be used with the system bus cards shown in FIGS. 3–5.

FIG. 6 is a diagrammatic illustration of a daughter card 315 of the type which can be electrically coupled to a system bus 100 on a system bus card 310 using slots 505 or 510. Positioned on daughter card 315 are one or more master or slave devices 605. For example, device 605 can be a core test chip, a FPGA programmed with various intellectual property (IP), or other standard devices such as CPUs or other devices. If device 605 is an IP test chip for a particular company, the test chip may not be designed to directly interface with the system bus on system bus cards 310. In these instances, a glue/interface FPGA may be required to convert the signals from the IP test chip such that they can be communicated with the system bus via system bus interface 615. In embodiments in which an IP test chip is not available for the particular company, the IP for the particular company can be programmed in a FPGA. In these embodiments, glue/interface FPGA 610 may not be required.

Frequently, systems will utilize mixed signal components. Since it can be difficult to implement mixed signal processing on FPGAs, a mixed signal IP test chip 620 can also optionally be included on daughter card 315 in some embodiments. Inputs from the ultimate system that the IC chip is going into can be fed to device 605 either directly using device interface 625, or through device interface 625 and mixed signal device 620. A further optional feature on daughter card 315 is test interface 630. Test interface 630 can be used to directly access device 605 for testing or other purposes.

Daughter cards 315 serve to model master and slave devices complete with mixed signal functionality as these devices would ultimately talk to the system bus in the final silicon chip. The particular devices illustrated in FIG. 6 are provided as examples, and are not intended to limit daughter card 315 to these particular devices. For example, in addition to test interface 630 and mixed signal device 620, other optional devices shown in FIG. 6 include the glue/interface FPGA.

The present invention is used to model a multi-bus system with components, both master and slave devices, that sit isolated on system busses. The present invention is also used to model slave or master devices with multiple ports that sit across multiple system busses. The architecture of system 300 for the present invention is such that it allows for reuse of every component, with the possible exception of daughter cards which contain unique devices or configurations for a particular project. Another possible exception to this is the multi-master or slave card examples 320 and 325 shown in FIG. 3.

The standardization which can be achieved using system 300 of the present invention as a development acceleration platform allows cost savings in building the system. The present invention allows the complete implementation of platform-based silicon, regardless of the configuration, as long as the configuration stays within the bounds supported by the system on a chip infrastructure that is used to build the chip. System 300 also allows the frequency of operations to be nearer to those which will exist in the actual silicon device in order to allow software development and interaction with real-time data streams. Further, system 300 provides flexibility and does not force designs into previously existing prototype systems, which ultimately alter the new design. Other advantages of system 300 include the fact that it allows hardware to work with real mixed signal silicon, and allows injection of any type of test point or test registers into the designs in order to design, debug, test architectural tradeoffs, etc.

Although the present invention has been described with reference to preferred embodiments, workers skilled in the art will recognize that changes may be made in form and detail without departing from the spirit and scope of the invention.

What is claimed is:

1. A configurable and scaleable multi-bus platform for developing, testing and/or debugging prototype systems to be implemented in an integrated circuit, the platform comprising:
    a backplane providing a plurality of busses;
    a plurality of system bus cards each physically coupleable to the backplane, each of the system bus cards comprising:
        a system bus which is electrically coupled to a corresponding one of the plurality of busses provided by the backplane when the system bus card is physically coupled to the backplane; and
        a bus infrastructure device providing support logic for operating the system bus on the system bus card; and
    a plurality of daughter cards each physically coupleable to one of the plurality of system bus cards and including at least one master or slave device, wherein when a particular daughter card is physically coupled to one of the plurality of system bus cards then at least one master or slave device of the particular daughter card is in electrical communication with the system bus of the system bus card.

2. The configurable and scaleable multi-bus platform of claim 1, wherein the platform further comprises a multi-master/multi-slave multi-bus-port card which is physically coupleable to the backplane, wherein the multi-master/multi-slave multi-bus-port card includes at least one interface device, and wherein when the multi-master/multi-slave multi-bus-port card is physically coupled to the backplane then at least one interface device is in electrical communication with one or more of the busses provided by the backplane.

3. The configurable and scaleable multi-bus platform of claim 1, wherein the bus infrastructure device of each of the plurality of system bus cards further comprises a bus arbiter.

4. The configurable and scaleable multi-bus platform of claim 3, wherein the bus infrastructure device of each of the plurality of system bus cards further comprises an address decoder.

5. The configurable and scaleable multi-bus platform of claim 4, wherein the system bus of each of the plurality of system bus cards further comprises a multi-master bus and a multi-slave bus, and wherein when daughter cards are physically coupled to a particular system bus card, master and slave devices on the daughter cards are electrically coupled to the multi-master bus and the multi-slave bus, respectively.

6. The configurable and scaleable multi-bus platform of claim 5, wherein the plurality of daughter cards includes master daughter cards having master devices thereon, and slave daughter cards having slave devices thereon.

7. The configurable and scaleable multi-bus platform of claim 6, wherein each system bus card further comprises a statistic generating device coupled to the system bus, the statistic generating device generating statistical information indicative of the performance of the system.

8. The configurable and scaleable multi-bus platform of claim 6, wherein each system bus card further comprises a debugging device which aids in debugging errors in the system.

9. The configurable and scaleable multi-bus platform of claim 6, wherein one or more of the plurality of daughter cards contain intellectual property devices to be integrated as masters/slaves in silicon.

10. The configurable and scaleable multi-bus platform of claim 7, wherein a daughter card containing an intellectual property device also includes a field programmable gate array configured to interface between the intellectual property device and a system bus on the corresponding system bus card.

11. The configurable and scaleable multi-bus platform of claim 6, wherein one or more of the plurality of daughter cards contain central processing units.

12. The configurable and scaleable multi-bus platform of claim 6, wherein at least one of the plurality of daughter cards contains a graphics engine device.

13. A configurable and scaleable multi-bus platform for developing, testing and/or debugging prototype systems to be implemented in an integrated chip, the platform comprising:
    a backplane providing a plurality of busses;
    a plurality of substantially identical system bus cards each physically coupleable to the backplane, each of the system bus cards comprising:
        a system bus which is electrically coupled to at least one of the plurality of busses provided by the backplane when the system bus card is physically coupled to the backplane; and a bus infrastructure device providing support logic for operating the system bus on the system bus card; and a plurality of daughter cards each physically coupleable to one of the plurality of system bus cards and including at least one master or slave device, wherein when a particular daughter card is physically coupled to one of the plurality of system bus cards then at least one master or slave device of the particular daughter card is in electrical communication with the system bus of the system bus card.

14. The configurable and scaleable multi-bus platform of claim 13, wherein for each of the plurality of system bus cards, the corresponding daughter cards coupled to that system bus card function with the system bus card to model a corresponding system bus on an integrated circuit to be implemented.

15. The configurable and scaleable multi-bus platform of claim 14, wherein the platform further comprises a multi-master/multi-slave multi-bus-port card which is physically coupleable to the backplane, wherein the multi-master/multi-slave multi-bus-port card includes at least one interface device, and wherein when the multi-master/multi-slave multi-bus-port card is physically coupled to the backplane then at least one interface device is in electrical communication with one or more of the busses provided by the backplane.

16. The configurable and scaleable multi-bus platform of claim 13, wherein the bus infrastructure device of each of the plurality of system bus cards further comprises a bus arbiter and an address decoder.

17. A configurable and scaleable multi-bus platform for developing, testing and/or debugging prototype systems to be implemented in an integrated chip, the platform comprising:

backplane means for providing a plurality of busses;

bus card means coupled to the backplane means for providing a plurality of system busses coupled to the plurality of busses provided by the backplane means; and daughter card means for configuring the bus card means in order to model a corresponding system bus on an integrated circuit to be implemented.

* * * * *